(12) United States Patent
Harif

(10) Patent No.: US 11,067,957 B2
(45) Date of Patent: Jul. 20, 2021

(54) METHOD AND APPARATUS FOR PROVISIONING AN ALTERNATIVE ENERGY SOURCE GENERATOR

(71) Applicant: Enphase Energy, Inc., Petaluma, CA (US)

(72) Inventor: Shlomi Harif, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 234 days.

(21) Appl. No.: 14/818,014

(22) Filed: Aug. 4, 2015

(65) Prior Publication Data

US 2016/0043684 A1 Feb. 11, 2016

Related U.S. Application Data

(60) Provisional application No. 62/033,389, filed on Aug. 5, 2014.

(51) Int. Cl.
| | |
|---|---|
| *G05B 15/02* | (2006.01) |
| *H04L 29/08* | (2006.01) |
| *H02J 3/38* | (2006.01) |
| *H02S 40/32* | (2014.01) |
| *H02J 13/00* | (2006.01) |

(52) U.S. Cl.
CPC .............. *G05B 15/02* (2013.01); *H02J 3/383* (2013.01); *H02S 40/32* (2014.12); *H04L 67/02* (2013.01); *H04L 67/025* (2013.01); *H04L 67/34* (2013.01); *H02J 13/00007* (2020.01); *H04L 67/12* (2013.01); *Y02E 10/56* (2013.01); *Y02E 40/70* (2013.01); *Y02E 60/00* (2013.01); *Y04S 10/123* (2013.01); *Y04S 40/121* (2013.01); *Y04S 40/18* (2018.05)

(58) Field of Classification Search
None
See application file for complete search history.

(56) References Cited

U.S. PATENT DOCUMENTS

| | | | | |
|---|---|---|---|---|
| 2012/0215367 A1* | 8/2012 | Eizips | ..................... | H02J 3/385 |
| | | | | 700/286 |
| 2012/0271576 A1* | 10/2012 | Kamel | ................ | H02J 13/0006 |
| | | | | 702/62 |
| 2012/0310427 A1* | 12/2012 | Williams | .................. | G05F 1/67 |
| | | | | 700/287 |

* cited by examiner

*Primary Examiner* — Mohammad Ali
*Assistant Examiner* — Saad M Kabir
(74) *Attorney, Agent, or Firm* — Moser Taboada

(57) ABSTRACT

A method and apparatus for provisioning an alternative energy source generator operable with a gateway in communication with a web portal. In one embodiment, the method includes entering system information into the gateway, and transmitting the system information to the web portal. The method also includes validating the system information, determining configuration information for the alternative energy source generator in response to validation of the system information, and transmitting the configuration information to the gateway. The method also includes initiating a discovery process to ascertain discovery information for the alternative energy source generator in response to the configuration information, and transmitting the discovery information to the web portal. The method still further includes validating the discovery information, and configuring the alternative energy source generator with the gateway in accordance with the configuration information and in response to validation of the discovery information.

20 Claims, 2 Drawing Sheets

METHOD AND APPARATUS FOR PROVISIONING AN ALTERNATIVE ENERGY SOURCE GENERATOR

This application claims the benefit of U.S. Provisional Application No. 62/033,389 entitled "Automated Provisioning of Arrays of Alternating Current Photovoltaic Modules," filed Aug. 5, 2014, which is incorporated herein by reference.

BACKGROUND

An emerging trend in photovoltaic ("PV") power systems is that of alternating current photovoltaic ("ACPV") modules. An ACPV module consists of the integration of a solar module (sometimes called a PV module, solar panel, or PV panel) and a small direct current-alternating current ("DC-AC") power converter (often called a microinverter). The ACPV module produces AC output power rather than DC output power that is output by a conventional (DC) solar module.

The ACPV modules produce a relatively small amount of power, typically in the range of 200 watts ("W") to 400 W. As such, they are normally aggregated in arrays of many ACPV modules in order to increase the overall power. Such arrays are often installed on rooftops and become difficult to access afterwards. As such, the most convenient time to collect the serial numbers and relative positioning of the ACPV modules is during installation.

The act of collecting identifying information of the ACPV module system is sometimes called "provisioning" the system. Provisioning may also include recording the geographic coordinates, time zone, address, and other relevant information of the system. Since ACPV modules are rapid to physically install compared to conventional systems of solar modules, it follows that the provisioning should also be comparatively fast. As such, the provisioning should be automated to the degree possible.

However, provisioning on the ACPV module systems has normally included a number of manual steps, making it error prone and potentially slower than it can be. In some cases, serial numbers (via bar codes or quick response ("QR") codes, for example), are scanned with a "gun" or cell phone camera or other suitable scanning device. To follow, there are a number of manual steps including downloading the data into a gateway (also referred to herein as a gateway device), manually entering time zone or other geographically-related data, and communicating that data back to a centralized location. Ideally, these steps (and others) would be more streamlined and take place concurrently, as much as possible, with the physical placement of the ACPV modules. In addition, there are errors that occur due to duplicates of gateway devices, ACPV modules, and possibly other equipment, since such equipment is sometimes moved or repurposed, or errors have been committed in the provisioning process. Such errors result in wasted time and money.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

Corresponding numerals and symbols in the different figures generally refer to corresponding parts unless otherwise indicated. The figures are drawn to clearly illustrate the relevant aspects of the preferred embodiments and are not necessarily drawn to scale

DETAILED DESCRIPTION OF ILLUSTRATIVE EMBODIMENTS

Figure 1:
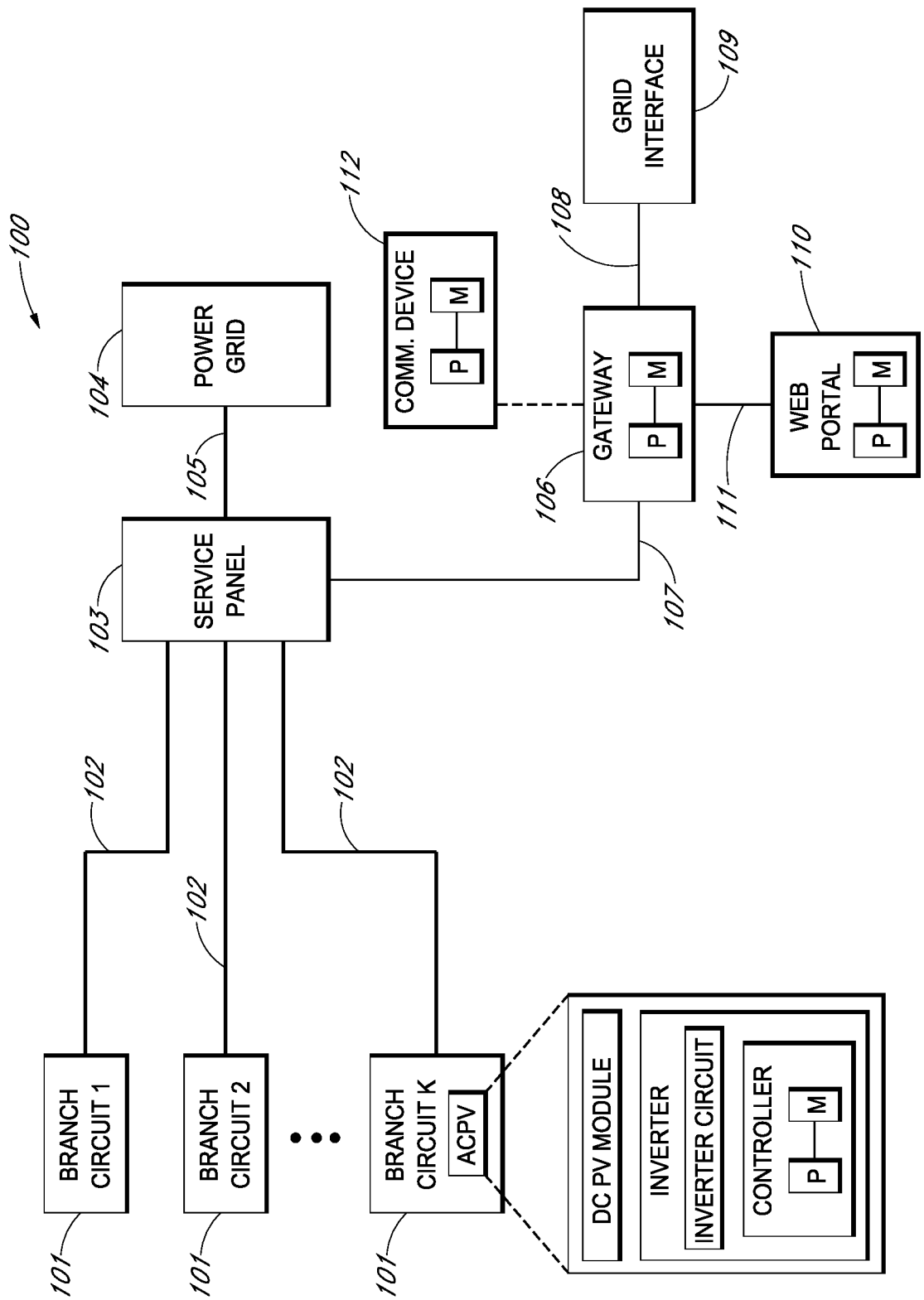
FIG. 1 illustrates a simplified block diagram of an embodiment of a system of alternative energy source generators and associated equipment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative FIGURES. Additionally, the inclusion of a structural or method feature in a particular FIGURE is not meant to imply that such feature is required in all embodiments and, in some embodiments, may not be included or may be combined with other features.

An automated method and process for provisioning a system of alternative energy source generators is described. In an embodiment, alternative energy source generators in the system are formed with ACPV modules. The method may include entering system information about the alternative energy source generators into a gateway, transmitting the system information about the alternative energy source generators to a web portal, validating the system information with the web portal, determining configuration information for the system with the web portal, transmitting the configuration information to the gateway, conducting a discovery process via the gateway, transmitting discovery information to the web portal via the gateway, validating and correcting the discovery information in the web portal, transmitting to the gateway corrected discovery information, and configuring the system in compliance with the configuration information.

The web portal may provide error messages regarding the system information, configuration information, or discovery information obtained by the gateway. The system information may include global positioning system ("GPS") coordinates, time zone and location information of the alternative energy source generators, naming information, and/or installer information. The entering of the system information may be conducted via manual entry directly into the gateway, via a mobile computer or phone either wired or connected wirelessly to the gateway, and/or via a scanning device. The configuration information may include utility grid settings and/or time zone information.

In another embodiment, an apparatus for automatically provisioning a system formed with alternative energy source generators is introduced. In an embodiment, the alternative energy source generators are ACPV modules. The apparatus may include a gateway that may be coupled to a web portal via an internet connection. The gateway may also be coupled to an array of alternative energy source generators. The gateway may communicate with the alternative energy source generators via a power line carrier ("PLC") protocol. The gateway may receive system information from a system installer. The gateway may, upon initiation, transmit the system information to the web portal. The web portal, upon receipt of the system information, may validate and record the system information. The web portal may communicate error messages or corrected system information to the gateway. The web portal may also communicate configuration information to the gateway. The gateway, upon receipt of the configuration information, may initiate a discovery process. The gateway, via the discovery process, may ascertain discovery information about the alternative energy source generators. The gateway, upon ascertaining the discovery information, may transmit the discovery information to the web portal. The web portal, upon receipt of the discovery information, may validate and record the discovery information. The web portal may also communicate an acknowledgement of the discovery information to the gateway. Upon receipt of an acknowledgement of the discovery information from the web portal, the gateway may configure the array of alternative energy source generators according to the configuration information.

The web portal may provide error messages regarding the system information, configuration information, or discovery information. The system information may include global positioning system ("GPS") coordinates, time zone information, location information, naming information, and/or installer information. The receiving the system information may be conducted via manual entry directly into the gateway, via a mobile computer or phone either wired or connected wirelessly to the gateway, and/or via a scanning device. The configuration information may include utility grid settings and/or time zone information.

Referring now to FIG. 1, illustrated is an embodiment of a system 100 for generating alternative energy including "K" branch circuits 101, each coupled to a service panel 103 via AC cables 102. The branch circuits 101 contain one or more "modules" that may be any kind of alternative energy source generator including the aforementioned ACPV modules (see, e.g., U.S. Pat. No. 8,599,587, which is incorporated herein by reference).

An exemplary ACPV module is illustrated with respect to the branch circuit 101 designated "Branch Circuit K." The ACPV module may be embodied as photovoltaic modules coupled to or including solar panels. As such, the ACPV module may include a DC photovoltaic module (designated "DC PV module") and an inverter. The DC photovoltaic module may be embodied as one or more photovoltaic cells and is configured to deliver DC power to the inverter in response to receiving an amount of sunlight. Of course, the DC power delivered by the DC photovoltaic module is a function of environmental variables such as, without limitation, sunlight intensity, sunlight angle of incidence and temperature. The inverter is configured to convert the DC power generated by the DC photovoltaic module to AC power. In some embodiments, the inverter and the DC photovoltaic module are located in a common housing. Alternatively, the inverter may include its own housing secured to the housing of the DC photovoltaic module. Additionally, in some embodiments, the inverter is separate from the housing of the DC photovoltaic module, but located nearby.

The inverters may include a DC-to-AC inverter circuit (designated "inverter circuit") and an inverter controller (designated "controller"). The DC-to-AC inverter circuit may be configured to convert the DC power generated by the DC photovoltaic module to AC power at the power grid frequency. The operation of the inverter may be controlled and monitored by the inverter controller. The illustrative inverter controller includes a processor (designated "P") and a memory (designated "M"). Additionally, the inverter controller may include other devices commonly found in controllers which are not illustrated in FIG. 1 for clarity of description. Such additional devices may include, for example, peripheral devices, data storage devices, input/output ports, and/or other devices.

The processor of the inverter controller (and other processors introduced herein) may be embodied as any type of processor capable of performing the functions described herein including, but not limited to, a microprocessor, digital signal processor, microcontroller, or the like. The processor is illustratively embodied as a single core processor, but may be embodied as a multi-core processor having multiple processor cores in other embodiments. Additionally, the inverter controller may include additional processors having one or more processor cores in other embodiments.

The memory of the inverter controller (and other memory introduced herein) may be embodied as one or more memory devices or data storage locations including, for example, dynamic random access memory devices ("DRAM"), synchronous dynamic random access memory devices ("SDRAM"), double-data rate synchronous dynamic random access memory device ("DDR SDRAM"), flash memory devices, and/or other volatile memory devices. The memory is communicatively coupled to the processor via a number of signal paths, such as a data bus, point-to-point connections, or other interconnects. Although only a single memory is illustrated in FIG. 1, in other embodiments, the inverter controller may include additional memory.

The service panel 103 is in turn coupled to the power grid 104 via a utility connection 105. This configuration is typical of residential and commercial buildings. The service panel 103 includes circuit breakers, surge suppression, bus bars, and other components understood by one of ordinary skill in the art to be commonly used or specified by building codes. One of ordinary skill in the art would also understand that the service panel 103 may be practically implemented by one or more panels, one of which may be known as an "aggregation" panel. Residential and commercial buildings may have more than one service panel 103, some of which may comprise the system 100 and some of which may serve typical load circuits, such as lighting, air conditioning, and the like. The power grid 104 may be any power grid, such as the United States interconnect, which typically provides 240 volts alternating current ("VAC") at 60 hertz ("Hz"). The utility connection 105 services as the point of connection to the power grid 104. Such utility connections 105 are often specified in terms of their current rating, such as a "200-amp service," for a system capable of providing up to 200 amperes ("A") of electrical current to the building.

The system 100 also includes at least one gateway 106 which functions as a communication unit and includes a processor (designated "P") and memory (designated "M"). The gateway 106 is shown connected to the service panel 103 via a communications connection 107, which may be a dedicated "hardline" connection to the service panel 103. The communications connection 107 may also be simply a power cord such as would normally be plugged into a normal wall power outlet. In that case, the gateway 106 and the communications connection 107 may be considered to be part of a branch circuit 101. In practice, the gateway 106 may be physically located at, near or within the service panel 103 in order to reduce (e.g., minimize) the distance that communication signals travel to reach the service panel 103. This is important in an embodiment, in which the gateway 106 communicates with the branch circuits 101 via power line carrier ("PLC") communications. However, if the gateway 106 does communicate via PLC communications, it may be plugged in anywhere in the building that ultimately couples to the service panel 103. Indeed, if there is more than one service panel 103, and all service panels are connected to the same power grid 104, then the gateway 106 may be coupled to any of the service panels 103. Locating the gateway 106 away from the service panel 103 may reduce communications fidelity, but some users may prefer a remote location to allow easier physical access.

The system 100 also includes a grid interface 109 by which operators of the power grid 104 may control the system 100. The grid interface 109 may be an automated control system, such as a supervisory control and data acquisition system ("SCADA"), internet portal, or other computer, computer network, or device capable of electronic communication. The grid interface 109 is coupled to the gateway 106 via a communications channel 108, which may be a wired or wireless internet connection using a protocol such as transmission control protocol/internet protocol ("TCP/IP"), a grid-based power line carrier connection (distinct from any power line carrier communications that may occur within the branch circuits 101), or any other suitable method for grid operators to enable electronic communication with the gateway 106.

The system 100 also includes a web portal 110 (including a processor (designated "P") and memory (designated "M")) that communicates with the gateway 106 with a web connection 111. It is also possible for the communications channel 108 to double as the web connection 111 if they are both internet-enabled communications channels. In any case, the web portal 110 is an interface that people or automated equipment can use to exchange data and instructions with the system 100. The web portal 110 may include a graphical user interface ("GUI") through which users may see visual representations of data and system configuration. Largely, however, the web portal 110 maintains a database of information about the system 100 in memory and generally of a large plurality of systems 100.

The database would include at least the serial numbers of the ACPV modules contained within the branch circuits 101, as well as the serial number of the gateway 106. In addition to the serial numbers, other identifying information such as the power grid configuration, product configuration, and the like. Naturally, the database could contain conflicting serial numbers, particularly in the case of manual entry of data. This information can be transmitted to the gateway 106 as a part of an acknowledgment, validation, or other message. The system 100 also includes a communication device (e.g., a computer or phone, or a scanning device including a processor (designated "P") and memory (designated "M")) 112 to allow wired or wireless connectively to the gateway 106 for providing information (e.g., system information, configuration information and/or discovery information) to or receiving information from the gateway 106.

Figure 2:
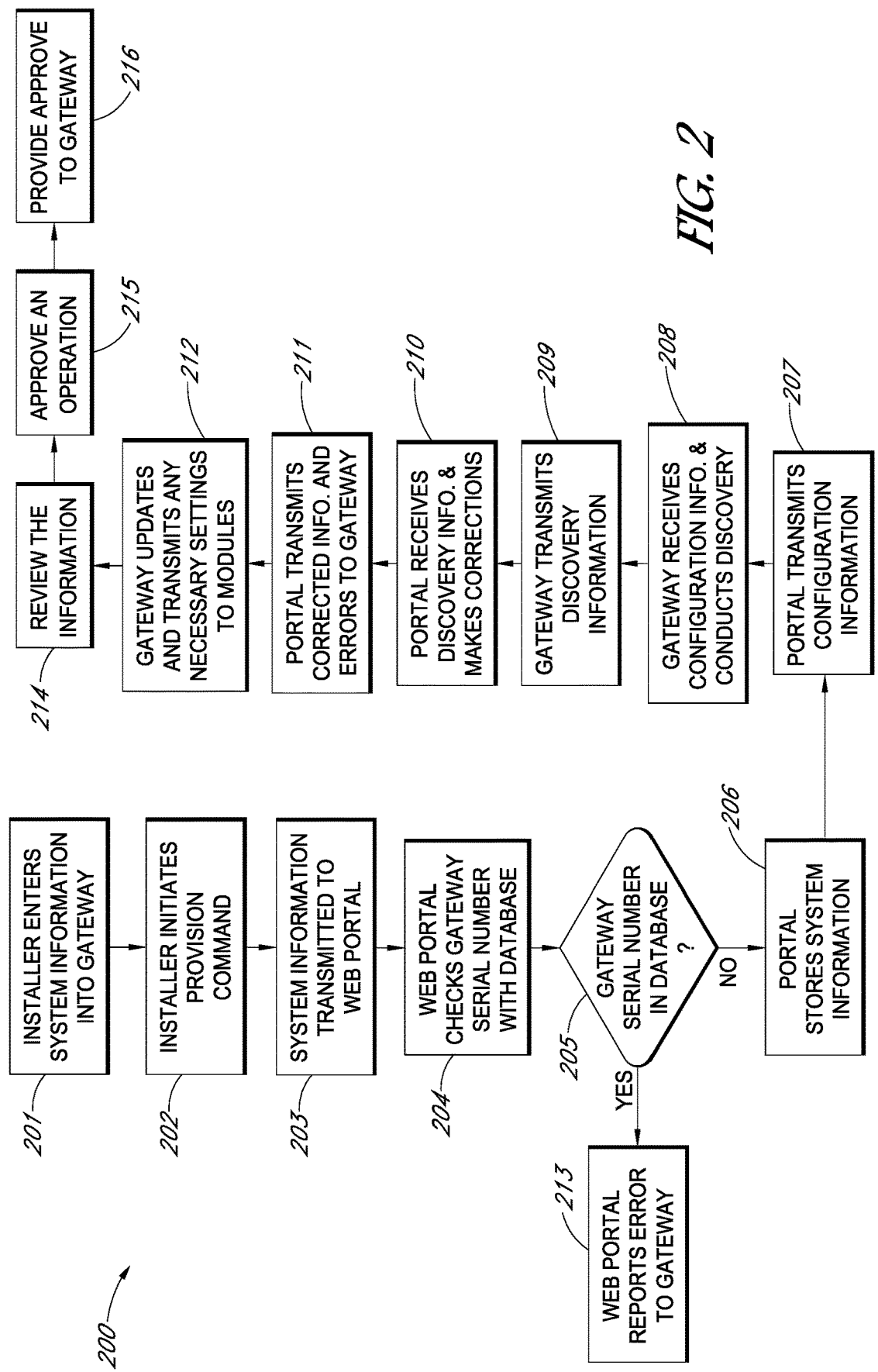
FIG. 2 illustrates a flow chart representing an embodiment of an automated provisioning method of the system of FIG. 1.

Turning now to FIG. 2, illustrated is an embodiment of a method 200 for automatic provisioning of the system 100 of FIG. 1. The method 200 begins after the physical installation of the system 100, wherein with a step 201 the installer enters the system information into the gateway 106. The system information includes at least a serial number (or equivalent identifier) of gateway 106. The system information may also include a phonetic name of the site (e.g., "Smith Residence" or "XYZ Industries Site #27"), a location (potentially provided by global positioning system ("GPS") data), and the name of the local electric utility. The GPS data may be obtained via a number of means, including a mobile computer or phone, or if so equipped, via the gateway 106 itself. Of course, other information can be entered during the step 201, depending on the precise configuration of the gateway 106 and the desires of the installer.

This data entry can be done manually, for instance, by keying it in through a pushbutton display on the gateway 106, or by connecting an aforementioned mobile computer or phone to the gateway 106 and utilizing the potentially richer graphical user interface available in such devices. The step 201 can also be accomplished with the aid of a bar code or QR code scanner that can retrieve the serial number of the gateway 106 and then transmit it to the gateway 106 via a wired or wireless connection. In any case, the step 201 completes with the entry of system information into the gateway 106.

The installer signals the completion of data entry in a step 202 by initiating a provision command. Initiating the provision command may be done simply by pressing an appropriate button on the gateway 106, or via the aforementioned mobile computer or phone, or any other known technique for signaling an electronic device to start a process. Upon receipt of the provision command, the system information is transmitted to the web portal 110 from the gateway 106 via the web connection 111 using any ordinary internet communications approach in a step 203.

Upon receipt of the system information, in a step 204, the web portal 110 checks or validates the system information against its existing database of system information, which may consist of information from numerous other sites. For example, as shown in FIG. 2, the serial number of the gateway 106 may be checked against serial numbers already stored in the database. Through data entry errors, it is possible for a serial number to be duplicated or otherwise incorrectly entered. Of course, other system information may also be checked for validity. For example, GPS coordinates may be checked for proper format and reasonableness and self-consistency (such as an entered ZIP code comports with the GPS coordinates). Such checks are accomplished in a step 205, wherein in FIG. 2 a non-limiting example is provided of a serial number check. As shown in FIG. 2, if the gateway 106 serial number is already in the database (i.e., the serial number is a duplicate), then the method 200 reports an error back to the gateway 106 in a step 213. Likewise, if any other error is detected, the method 200 is terminated and the error is reported back to the gateway 106. At this point, the installer may restart the method 200 after having corrected any reported errors.

In the case where no errors are reported, a step 206 is entered, wherein the web portal 110 stores the validated information in its database. Following this, in a step 207, the web portal 110 determines configuration information and transmits it to the gateway 106. Example configuration information would include the time zone and any special utility grid settings. More specifically, the time zone may be determined with the aid of the aforementioned GPS coordinates. The utility grid settings vary by location and utility service. As one of many examples, in parts of Hawaii there are exceptions to the usual inverter standard of IEEE 1547, which is incorporated herein by reference, for trip limits. In one case, a lower frequency trip limit is required to be 57 Hz rather than the conventional 59.3 Hz. As such, the step 207 of the automatic provisioning can avoid errors on the part of the installer in entering mistaken configuration settings, which may vary from site to site and from time to time.

In a step 208, the configuration information has been received by the gateway 106. As is conventional with internet communications, the gateway 106 will have acknowledged receipt of the information and the web portal 110 may record this acknowledgement. Such a feature may be helpful to installers, inspectors, or customer service agents in determining that the gateway 106 indeed has been properly configured. Upon receipt of the configuration information, the gateway 106 automatically initiates a "discovery" process wherein the ACPV modules within the branch circuits 101 are discovered by the gateway 106. The discovery process effectively amounts to determining the serial numbers (or other identifying information) of all the ACPV modules that are included within the system 100. As an example, see U.S. Patent Application Publication No. 2012/0089260, which is incorporated herein by reference, for an exemplary discovery process. Upon conclusion of the discovery, the gateway 106 contains the discovery information, including at least the serial number of the ACPV modules from the system 100 as well as any other pertinent information.

In a step 209, the discovery information is transmitted back to the web portal 110. The discovery information is received in a step 210, wherein the web portal 110 records the discovery information along with the system information. The step 210 serves as further acknowledgement of a successful system provisioning. However, just as in the step 205, it is possible that errors have occurred during the discovery process. As such, the web portal 110 will cross-reference the discovery information with its database and report any errors or corrections in a step 211. Some errors may be easily and automatically correctable, while others may reveal duplicate ACPV modules or other irreconcilable conflicts. Although not explicitly shown in FIG. 2, if errors are transmitted back to the gateway 106, then naturally the installer can take corrective action and repeat the discovery process starting at the step 208. Ordinarily, the gateway 106 will be provided with manual overrides to the automated method 200, so that troubleshooting may occur on the part of the installer or customer service agents. For example, the installer may be aware that 20 ACPV modules have been physically installed, but the discovery information reveals that only 19 have been discovered. Such a situation reveals to the installer that one ACPV module is malfunctioning or improperly installed. Such troubleshooting features and manual overrides are not explicitly shown in FIG. 2, but should be understood by one of ordinary skill in the art to be necessary.

Upon completion of the step 211, the gateway 106 updates its own records of system information, configuration information, and discovery information, and configures the ACPV modules in the system 100 with the configuration information in a step 212. The gateway 106 can transmit any special signals to the ACPV modules in the system 100 in accordance with the configuration information. For example, if special trip limits have been provided for the configuration information, then the gateway 106 will proceed to program each ACPV module with the special trip limits in the step 212.

Via the web portal 110, a third party, such as an inspector or other government official, may review the system information, configuration information, and discovery information in a step 214. This third party may further be able to ascertain that the system 100 has been properly installed and configured and, thereafter, issue an approval to operate the system 100 in a step 215. This approval may be provided via the web portal 110 and recorded in its database. The approval may also be provided and recorded in the gateway 106 in a step 216.

Thus, a method and apparatus for automatic provisioning of a system of alternative energy source generators such as ACPV modules with readily attainable and quantifiable advantages has been introduced. In an embodiment, the method includes entering, into a gateway, system information and transmitting the system information from the gateway to a web portal. Once the system information is validated, the web portal transmits an error message or configuration information to the gateway. Upon receipt of configuration information, the gateway initiates a discovery process of the ACPV modules in the system and transmits discovery information to the web portal. The web portal validates the discovery information and transmits an error message or an acknowledgement message to the gateway. In response thereto, the gateway configures the ACPV modules. While the aforementioned method describes the provisioning with respect to a gateway and web portal, it should be understood that the provisioning can be performed by a single entity or further distributed as the application dictates.

In an embodiment, an apparatus (e.g., a gateway) for provisioning of an alternative energy source generator (e.g., an ACPV module) includes a processor, and memory including computer program code. The memory and the computer program code are configured to, with the processor, cause the apparatus to receive system information, transmit the system information to a web portal, and receive configuration information for the alternative energy source generator in response to validation of the system information. The memory and the computer program code are further configured to, with the processor, cause the apparatus to initiate a discovery process to ascertain discovery information for the alternative energy source generator in response to the configuration information, transmit the discovery information to the web portal, and configure the alternative energy source generator in accordance with the configuration information and in response to validation of the discovery information. If the system information is not validated, the memory and the computer program code are further configured to, with the processor, cause the apparatus to receive an error message from the web portal, re-receive the system information, and retransmit the system information to the web portal for revalidation. If the discovery information is not validated, the memory and the computer program code are further configured to, with the processor, cause the apparatus to receive an error message from the web portal, reinitiate the discovery process to ascertain the discovery information for the alternative energy source generator, and retransmit the discovery information to the web portal for revalidation. The apparatus is operable to communicate with the alternative energy source generator via a power line carrier ("PLC") protocol. In accordance with the invalid information mentioned herein, the respective apparatus may receive the same type of information with different values to revalidate the invalid information.

In an embodiment, an apparatus (e.g., a web portal) for provisioning of an alternative energy source generator (e.g., an ACPV module) includes a processor, and memory including computer program code. The memory and the computer program code are configured to, with the processor, cause the apparatus to receive system information from a gateway, validate the system information, and determine configuration information for the alternative energy source generator in response to validation of the system information. The memory and the computer program code are further configured to, with the processor, cause the apparatus to transmit the configuration information to the gateway, receive discovery information for the alternative energy source generator in response to the configuration information, and validate the discovery information to allow the gateway to configure the alternative energy source generator in accordance with the configuration information and in response to validation of the discovery information. The memory and the computer program code are further configured to, with the processor, cause the apparatus to review the system information, the configuration information and the discovery information, approve an operation of the alternative energy source generator based on the system information, the configuration information and the discovery information, and provide an approval of the operation to the gateway. If the system information is not validated, the memory and the computer program code are further configured to, with the processor, cause the apparatus to send an error message to the gateway, re-receive the system information from the gateway, and revalidate said system information. If the discovery information is not validated, the memory and the computer program code are further configured to, with the processor, cause the apparatus to send an error message to the gateway, re-receive the discovery information for the alternative energy source generator in response to the configuration information, and revalidate the discovery information to allow the gateway to configure the alternative energy source generator in accordance with the configuration information and in response to validation of the discovery information.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for provisioning an alternative energy source generator operable with and connected to a gateway in communication with a web portal located remotely from said gateway, comprising:

entering system information into said gateway comprising scanning the system information from the gateway using a communication device and transmitting the system information from the communication device into the gateway;

transmitting said system information from said gateway to said web portal;

validating said system information with said web portal comprising determining if a serial number of the gateway is a duplicate of another serial number already in a database accessible by the web portal;

determining configuration information with said web portal for said alternative energy source generator in response to validation of said system information;

transmitting said configuration information from said web portal to said gateway;

initiating a discovery process with said gateway to ascertain discovery information for said alternative energy source generator in response to said configuration information;

transmitting said discovery information from said gateway to said web portal;

validating said discovery information with said web portal comprising determining if a serial number of the alternative energy source generator is a duplicate of another serial number already in the database accessible by the web portal;

configuring said alternative energy source generator with said gateway in accordance with said configuration information and in response to validation of said discovery information; and if one of said system information or discovery information is not validated, sending an error message to said gateway.

2. The method as recited in claim 1, further comprising:

reviewing said system information, said configuration information and said discovery information via said web portal;

approving an operation of said alternative energy source generator based on said system information, said configuration information and said discovery information; and providing an approval of said operation to said gateway.

3. The method as recited in claim 1 wherein if said system information is not validated, further comprising:

reentering said system information into said gateway;

retransmitting said system information to said web portal; and revalidating said system information with said web portal.

4. The method as recited in claim 1 wherein if said discovery information is not validated, further comprising:
reinitiating said discovery process with said gateway to ascertain said discovery information for said alternative energy source generator;
retransmitting said discovery information to said web portal; and
revalidating said discovery information with said web portal.

5. The method as recited in claim 1 wherein the communication device is one of a bar code or QR code scanner.

6. The method as recited in claim 1 wherein said gateway communicates with said alternative energy source generator via a power line carrier (PLC) protocol.

7. The method as recited in claim 1 wherein said alternative energy source generator is an alternating current photovoltaic (ACPV) module.

8. The method as recited in claim 1 wherein said system information comprises global positioning system (GPS) coordinates, time zone information, location information, naming information, or installer information.

9. The method as recited in claim 1 wherein said configuration information comprises utility grid settings or time zone information.

10. The method as recited in claim 1 wherein said discovery information comprises identifying information of said alternative energy source generator.

11. An apparatus for provisioning of and connected to an alternative energy source generator, comprising:
a processor; and
memory including computer program code, said memory and said computer program code configured to, with said processor, cause said apparatus to perform at least the following:
scan system information from a gateway using a communication device and transmit the scanned system information from the communication device into the gateway;
receive the system information;
transmit said system information to a web portal located remotely from said apparatus;
receive configuration information from said web portal for said alternative energy source generator in response to validation of said system information, wherein the validation of said system information comprises determining if a serial number of the gateway is a duplicate of another serial number already in a database accessible by the web portal;
initiate a discovery process to ascertain discovery information for said alternative energy source generator in response to said configuration information;
transmit said discovery information to said web portal;
configure said alternative energy source generator in accordance with said configuration information and in response to validation of said discovery information with said web portal, wherein the validation of said discovery information comprises determining if a serial number of the alternative energy source generator is a duplicate of another serial number already in the database accessible by the web portal; and
if one of said system information or discovery information is not validated, receiving an error message from said web portal.

12. The apparatus as recited in claim 11, wherein if said system information is not validated, said memory and said computer program code are further configured to, with said processor, cause said apparatus to:
re-receive said system information; and
retransmit said system information to said web portal for revalidation.

13. The apparatus as recited in claim 11, wherein if said discovery information is not validated, said memory and said computer program code are further configured to, with said processor, cause said apparatus to:
reinitiate said discovery process to ascertain said discovery information for said alternative energy source generator; and
retransmit said discovery information to said web portal for revalidation.

14. The apparatus as recited in claim 11, wherein said apparatus communicates with said alternative energy source generator via a power line carrier (PLC) protocol.

15. The apparatus as recited in claim 11 wherein said alternative energy source generator is an alternating current photovoltaic (ACPV) module.

16. An apparatus for provisioning of and remotely located from an alternative energy source generator, comprising:
a processor; and
memory including computer program code, said memory and said computer program code configured to, with said processor, cause said apparatus to perform at least the following:
scan system information from a gateway using a communication device and transmit the scanned system information from the communication device into the gateway;
receive the system information from the gateway connected to said alternative energy source generator;
validate said system information, wherein validating said system information comprises determining if a serial number of the gateway is a duplicate of another serial number already in a database accessible by a web portal;
determine configuration information for said alternative energy source generator in response to validation of said system information;
transmit said configuration information to said gateway;
receive discovery information from said gateway for said alternative energy source generator in response to said configuration information;
validate said discovery information to allow said gateway to configure said alternative energy source generator in accordance with said configuration information and in response to validation of said discovery information, wherein the validation of said discovery information comprises determining if a serial number of the alternative energy source generator is a duplicate of another serial number already in the database accessible by the web portal; and
if one of said system information or discovery information is not validated, send an error message to said gateway.

17. The apparatus as recited in claim 16, wherein said memory and said computer program code are further configured to, with said processor, cause said apparatus to:
review said system information, said configuration information and said discovery information;

approve an operation of said alternative energy source generator based on said system information, said configuration information and said discovery information; and provide an approval of said operation to said gateway.

18. The apparatus as recited in claim 16, wherein if said system information is not validated, said memory and said computer program code are further configured to, with said processor, cause said apparatus to:

re-receive said system information from said gateway; and revalidate said system information.

19. The apparatus as recited in claim 16, wherein if said discovery information is not validated, said memory and said computer program code are further configured to, with said processor, cause said apparatus to:

re-receive said discovery information for said alternative energy source generator from said gateway in response to said configuration information; and revalidate said discovery information to allow said gateway to configure said alternative energy source generator in accordance with said configuration information and in response to validation of said discovery information.

20. The apparatus as recited in claim 16 wherein said alternative energy source generator is an alternating current photovoltaic (ACPV) module.

\* \* \* \* \*